US010924439B2

(12) United States Patent
Kamat et al.

(10) Patent No.: US 10,924,439 B2
(45) Date of Patent: Feb. 16, 2021

(54) HYBRID CONVERSATIONAL CHAT BOT SYSTEM

(71) Applicant: HRB Innovations, Inc., Las Vegas, NV (US)

(72) Inventors: Vinayak Kamat, Overland Park, KS (US); Roman Breslav, Newton, MA (US)

(73) Assignee: HRB Innovations, Inc., Las Vegas, NV (US)

( * ) Notice: Subject to any disclaimer, the term of this patent is extended or adjusted under 35 U.S.C. 154(b) by 284 days.

(21) Appl. No.: 15/450,657

(22) Filed: Mar. 6, 2017

(65) Prior Publication Data
US 2018/0255006 A1 Sep. 6, 2018

(51) Int. Cl.
*G06F 15/16* (2006.01)
*H04L 12/58* (2006.01)
*G06F 40/35* (2020.01)

(52) U.S. Cl.
CPC .............. *H04L 51/02* (2013.01); *G06F 40/35* (2020.01); *H04L 51/04* (2013.01)

(58) Field of Classification Search
CPC ...................................................... H04L 51/02
USPC ......................................................... 709/206
See application file for complete search history.

(56) References Cited

U.S. PATENT DOCUMENTS

| 8,858,313 | B1 * | 10/2014 | Selfors | A63F 13/65 463/9 |
| 8,996,639 | B1 * | 3/2015 | Faaborg | H04L 51/02 709/206 |
| 9,161,066 | B1 * | 10/2015 | Oztaskent | H04N 21/4758 |
| 2004/0216052 | A1 * | 10/2004 | Methot | G06F 9/453 715/705 |
| 2006/0026256 | A1 * | 2/2006 | Diddee | H04L 51/04 709/207 |
| 2007/0162455 | A1 * | 7/2007 | Oney | G06F 40/174 |
| 2007/0288576 | A1 * | 12/2007 | Illg | G06Q 10/107 709/206 |
| 2009/0286219 | A1 * | 11/2009 | Kisin | G06Q 10/10 434/362 |
| 2010/0042692 | A1 * | 2/2010 | Irwin | H04N 21/6581 709/206 |

(Continued)

OTHER PUBLICATIONS

Messenger Platform; facebook for developers; Date Printed: Jun. 8, 2017; Date Posted: Unknown; <https://developers.facebook.com/docs/messenger-platform>.

(Continued)

*Primary Examiner* — Anthony Mejia
(74) *Attorney, Agent, or Firm* — Erise IP, P.A.

(57) ABSTRACT

Method, system and media for a hybrid chat bot system that enables a user interface that can interact via simple text messages or rich chat bubbles with smart analytical data and provide a rich and efficient way for the user to respond. The hybrid chat bot system may also include a configurable scripting language for guiding the flow of the interview based on the information to be gathered, the user history with the system and the user's preferred method of interaction. The hybrid chat system may also include a way for a subject matter expert to seamlessly enter and exit the chat in the event of user difficulty to provide additional explanation or guidance, while retaining access to the rich chat bubbles with the associated variety of user interaction patterns.

19 Claims, 4 Drawing Sheets

(56) References Cited

U.S. PATENT DOCUMENTS

| | | | |
|---|---|---|---|
| 2010/0293461 A1* | 11/2010 | Boezeman | G06F 16/95 715/708 |
| 2011/0238763 A1* | 9/2011 | Shin | G06Q 10/10 709/206 |
| 2012/0016695 A1* | 1/2012 | Bernard | G06Q 40/08 705/4 |
| 2012/0076283 A1* | 3/2012 | Ajmera | H04L 12/1827 379/93.17 |
| 2012/0301864 A1* | 11/2012 | Bagchi | A61B 5/00 434/362 |
| 2013/0301482 A1* | 11/2013 | Katis | H04L 65/1083 370/276 |
| 2013/0346382 A1* | 12/2013 | Varthakavi | G06F 16/958 707/706 |
| 2014/0006524 A1* | 1/2014 | Singh | G09B 7/02 709/206 |
| 2014/0143023 A1* | 5/2014 | Reddington | G06Q 10/0637 705/7.36 |
| 2014/0227675 A1* | 8/2014 | Budhu | G09B 7/02 434/362 |
| 2014/0236852 A1* | 8/2014 | Emmerton | G06Q 10/1053 705/321 |
| 2014/0244457 A1* | 8/2014 | Howell | G06Q 40/02 705/31 |
| 2014/0298260 A1* | 10/2014 | Abowd | G06F 3/04842 715/810 |
| 2014/0343937 A1* | 11/2014 | Katis | H04L 51/046 704/235 |
| 2015/0277560 A1* | 10/2015 | Beaty | G06F 3/015 345/156 |
| 2015/0312180 A1* | 10/2015 | Taler | G06F 3/04895 715/752 |
| 2016/0132198 A1* | 5/2016 | Sinclair | G06Q 50/01 715/739 |
| 2017/0060545 A1* | 3/2017 | Allen | G06F 11/302 |
| 2017/0169101 A1* | 6/2017 | Walia | G06Q 30/016 |
| 2018/0007202 A1* | 1/2018 | Batlle | H04M 3/5166 |
| 2018/0150739 A1 | 5/2018 | Wu | G06N 3/006 |
| 2018/0239837 A1* | 8/2018 | Wang | G06F 16/90335 |
| 2019/0138646 A1* | 5/2019 | Dechu | G06F 16/3329 |

OTHER PUBLICATIONS

Bot Framework; Microsoft; Date Printed: Jun. 8, 2017; Date Posted: Unknown; Copyright 2017; <https://dev.botframework.com>.

* cited by examiner

HYBRID CONVERSATIONAL CHAT BOT SYSTEM

BACKGROUND

1. Field

Embodiments of the invention generally relate to smart user agents for conducting interviews with users and, more particularly, to a hybrid conversational bot system that enables a new and improved user interface that can interact via simple text messages or rich chat bubbles with smart analytical data and provide a rich and efficient way for the user to respond.

2. Related Art

Traditionally, chat interfaces interact with a user via an exchange of textual messages. Such systems force a user into a single interface paradigm that may not be appropriate for all interactions. Furthermore, such systems do not provide the user experience that modern user have come to expect from computer interfaces and that is required to provide a carefully crafted custom guided flow with rich-user interface design patterns in order to drive the user. As such, a hybrid conversational chat interface is needed that provides customizability in terms of user interface as well as interview script flow, while maintaining the user-friendly, context-aware interaction of a configurably scripted chat bot system.

SUMMARY

Embodiments of the invention address the above-described need by providing for a custom, configurable chat bot with a rich user interface and user experience. In particular, in a first embodiment, the invention includes a method of conducting an interview with a user comprising the steps of loading an interview script including a plurality of interview questions determining a question for the user based on the interview script and one or more prior responses previously given by the user determining a prompt for the question based on the question and a current context of the interview determining one or more response widgets for the question based at least in part on a type of information being sought by the question presenting a rich chat message to the user including the one or more response widgets and receiving, from the user and via one of the one or more response widgets, a response to the question.

In a second embodiment, the invention includes a system for conducting an interview with a user comprising an interview script data store storing a plurality of interview questions an interview engine, programmed to retrieve, from the interview script data store, an interview question of the plurality of interview questions a chat engine, programmed to determine a prompt for the interview question based on a current context of the interview a user interface engine, programmed to determine one or more response widgets for the question based at least in part on a type of information being sought by the question and present the prompt and the one or more response widgets for the question to the user and a live chat interface, programmed to allow a subject matter expert to seamlessly enter the interview and chat with the user.

In a third embodiment, the invention includes one or more non-transitory computer storage media storing computer-executable instructions that, when executed by a processor perform a method of conducting an interview with a user comprising the steps of determining an interview question for the user based on a current context of the interview determining a prompt for the interview question based on the interview question, a current context of the interview, and an expertise level associated with the user determining one or more response widgets for the interview question based at least in part on a type of information being sought by the interview question presenting a rich chat message to the user including the one or more response widgets and receiving, from the user and via one of the one or more response widgets, a response to the interview question.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
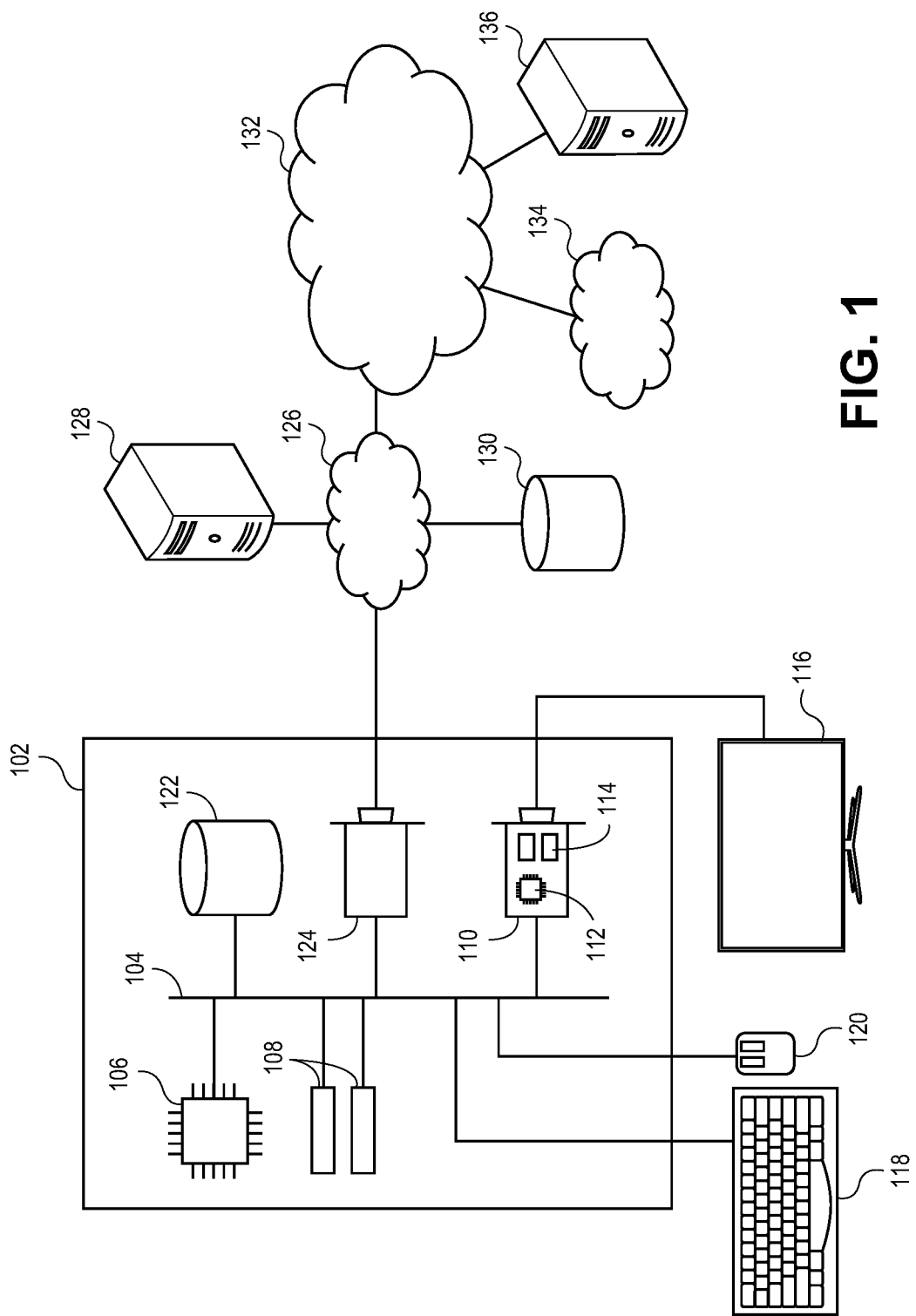
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for a scriptable chat bot with a rich user interface for use in effectively interviewing a user to determine needed information. The hybrid chat bot can present the user with simple textual messages, rich chat bubbles with smart analytical data presented with a custom user interface, and a rich and efficient way for the user to respond. Broadly speaking, the user interface is a hybrid of a conventional chat interface, and modern user interface design with rich user interaction patterns.

The hybrid chat bot system may further include a configurable scripting language for guiding the flow of the interview based on the information to be gathered, the user's history with the system and the user's preferred method of interaction. The hybrid chat system further includes a way for a subject-matter expert to seamlessly enter and exit the chat in the event of user difficulty to provide additional explanation or guidance, while retaining access to the rich chat bubbles with the associated variety of user interaction patterns.

The subject matter of embodiments of the invention is described in detail below to meet statutory requirements;

however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (, the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
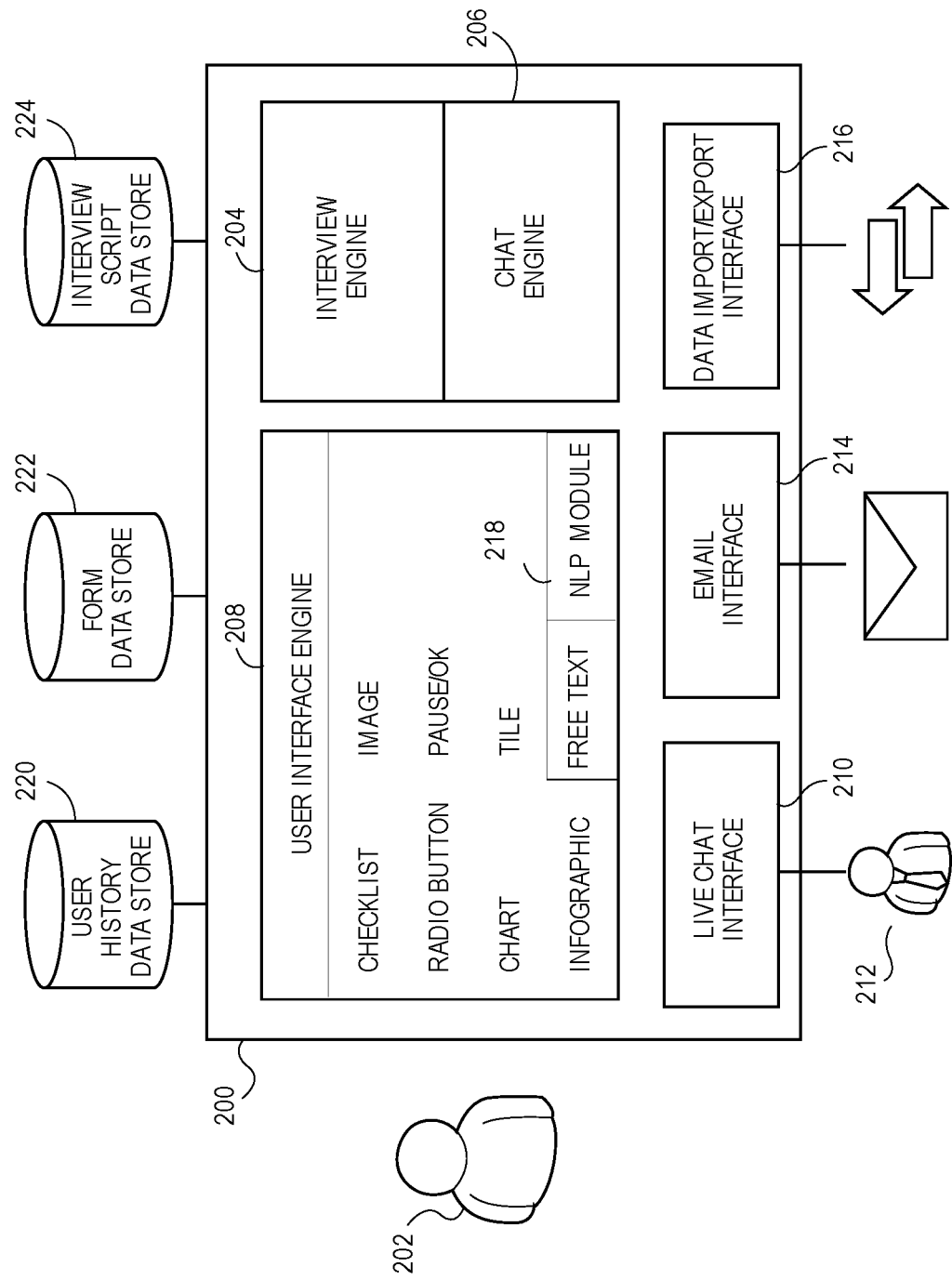
FIG. 2 depicts a block diagram illustrating certain components of the invention.

Turning now to FIG. 2, a block system diagram illustrating certain components of the invention is depicted and referred to generally by reference numeral 200. Broadly, system 200 allows user 202 to more efficiently and accurately provide standardized information for subsequent processing. For example, in the context of tax preparation, system 200 might conduct a tax interview of a taxpayer to collect the necessary information to prepare their tax return. Alternatively, system 200 could collect information on a job seeker's qualifications, experience, and credentials in order to prepare a resume and complete a variety of different job applications. As yet another alternative, system 200 could collect a student's grades, interests, and extracurricular activities to complete one or more college applications. Broadly, system 200 is applicable in any application where unstructured information must be gathered from user 202 for use in automated or standardized processing.

In the depicted embodiment, system 200 broadly comprises interview engine 204, chat engine 206, and user interface engine 208. Interview engine 204 may communicate with interview script data store 224 to determine an interview script to gather the appropriate information from user 202. In some embodiments, a variety of scripts may be available for gathering the same information. For example, in the tax preparation context, one script may be used if user 202 is a tax professional, a different script may be used if user 202 is a taxpayer preparing a simple return, and a third script may be used if the taxpayer is preparing a complex return. In some embodiments, system 200 can gather information for a wide variety of applications, depending on the interview script used.

Interview engine 204 is functional to determine, based on the interview script, one or more data points to be gathered (also referred to herein as "questions") from the interview process and an order in which they should be gathered. In some embodiments, interview engine 204 models the structure of the interview on how a human interviewer would conduct the interview. For example, related data points may be gathered together, even if they are used at different points when processing the data. In some embodiments, the interview script itself instead determines the order in which questions are presented. The options for gathering a given data point from a user are described below with respect to user interface engine 208.

Once a data point to be gathered from the user is determined, chat engine 206 formulates a prompt for the question to present to the user. Broadly, the prompt may be formulated in any way that will elicit an accurate response from user 202. In some embodiments, chat engine 206 takes the form of a conversational chat bot that maintains context between questions. One or more prompts may be posed for any given question. For example, in the context of a student preparing college applications, one question may be what honors classes the student has taken. A conversational chat bot could break this down (depending on the intermediate responses) into the prompts "Have you taken any honors classes?," "How many?," "Was one of those a math class?" and so on until information regarding all honors classes has been gathered.

Because chat engine 208 maintains context for the interview, it can prompt user 202 for information using multi-step or multi-part prompts. Additionally, unlike conventionally scripted interviews, chat engine 208 can help user 202 understand questions. For example, if user 202 does not understand what question is being asked, they can respond with "I don't understand" (or any similar response). Interface engine 202 can then clarify the question, break it down into smaller or simpler prompts, or further explain the information being sought. Furthermore, chat engine 208 can learn and adapt the level of prompts to the expertise of user 202. For example, in the tax preparation context, a tax professional might simply be asked whether the taxpayer is required to file a Schedule C, while a taxpayer preparing their own return would instead be asked first if they owned their own business, then whether the business was incorporated, and so forth.

Once the question and the prompt(s) are determined, user interface engine 208 determines the best format for response by user 202. In some embodiments, the form of a data point may itself determine the way in which it is gathered from a user. For example, a binary data value (such as, for example, a checkbox on a form) may be gathered from user 202 by presenting a question with a check box. In other embodiments, data points can be gathered in a variety of ways using different prompts. For example, the user could be presented with radio buttons corresponding to "yes" and "no," the user could be prompted to respond in a free text response by typing out "yes" or "no," or icons for "yes" and "no" could be presented for the user to click on. In some embodiments, a prompt is presented in combination with a text entry box. Thus, for example, the user could either click on a "yes" radio button, type "yes" in the free text entry box, or type another response (such as "I don't understand" or "Ask me later").

Broadly speaking, system 200 provides a wide variety of methods for user 202 to interact with the system. These methods are generally referred to herein as "interaction widgets," and may provide information to user 202, receive information from user 202, both, or neither. A chat bubble or char message including more than a single free text interaction widget is referred to herein as a "rich chat bubble" Broadly speaking, any control element (now known or later developed) is contemplated as begin within the scope of the invention. Table 1 below provides an illustrative, non-limiting list of widgets that may be presented to user 202.

TABLE 1

| Widget Type | Input/Output |
| --- | --- |
| Checklist | Input |
| Radio Button | Input |
| Dropdown list | Input |
| Chart | Output |
| Infographic | Output |
| Image | Output |
| Balloon Help | Output |
| Pause/OK | Neither |
| Tileset | Both |
| Free text | Both |
| Full Screen View (automatic) | Output |
| Full Screen View (user triggered) | Output |
| Progress View | Output |
| Progress View with Slider Control | Both |

Some of the widgets described in Table 1 will be immediately familiar to one of ordinary skill in the art. However, others are specific to the invention. For example, a particular message may cause a full screen view to be triggered, obscuring the remainder of the chat window until the user dismisses the full-screen view. Alternatively, a message may include a user-triggered full-screen view, where the user must affirmatively take action (by clicking on a link offering more information) for the full screen view to be displayed.

Certain widgets may not present information directly, but rather display and/or control progress through the interview. For example, the progress view may display an animated progress bat showing each step in the interview process that has been completed as well as those left to complete. Alternatively, a progress view with slider control may allow the user to not merely view the progress through the interview, but to control it. Thus, for example, a user can advance the progress view (by swiping left) to skip the current step in favor of completing a future step or reverse the progress view (by swiping right) to return to a previously completed step.

As mentioned above, the "free text" widget listed in Table 1 can be presented alone or in combination with another widget. This allows user 202 more flexibility in how to respond. In order to maximize this flexibility, some embodiments include a Natural Language Processing (NLP) module 218 to better understand user free-text responses. For example, the question "Did you attend college" may be presented to the user in combination with a "yes/no" radio button widget. Also including a free text widget allows an unsure user the option to provide an answer other than yes or no.

In such cases, a user may provide a wide variety of answers with various purposes. One potential response might seek greater detail in the question ("Does Community College count?"). Another potential response might provide details of the user's situation ("I started in January" or "Currently enrolled"). A third potential response simply answers the question ("No," "N," or "Never"). By using the techniques of Natural Language Processing, NLP module 218 enables chat engine 208 to distinguish the various classes of answers, apply any details provided by the user to the question, and respond appropriately. For example, in response to a user entering "Does Community College count?," the system can provide the user with additional information about what counts as a college in the form of free text or a help balloon. Alternatively, the system can determine the appropriate response to the question based on the details provided. For example, if the user enters "Currently Enrolled," system 200 might determine that the answer to the question is "yes" based on the context of the question.

As depicted, system 200 further comprises live chat interface 210, email interface 214, and data input/export interface 216. Live chat interface 210 allows a human operator (such as a subject matter expert) to seamlessly take over whenever chat engine 208 fails to communicate with user 202. For example, if the user exhausts the ability of chat engine 208 to explain a question, system 200 may engage live chat interface 210 with human operator 208 to further explain. Similarly, if system 200 detects suspicious activity (for example, indicators of fraud), live chat interface may be engaged to confirm or rule out the suspected activity. In this way, a single operator can simultaneously service a large number of clients such as user 202, while user 202 can remain in the same chat whether they are conversing with chat engine 208 or live operator 212. In some embodiments, live chat interface 210 provides a free-text dialogue with user 202. In other embodiments, operator 212 has access to all (or a subset) of the interaction widgets provided by system 200. Live chat interface 210 may provide operator 212 with access to the prior chat transcript, information from user history data store 220, and information regarding the portion of the interview script currently being executed. In still other embodiments, operator 212 can control all of the components of system 200, such as email interface 214 and data input/output interface 216.

Email interface 214 broadly allows for durable, non-realtime communication with user 202 and other parties outside of system 200. For example, user 202 may be emailed a transcript of the interview upon completion or session end. Alternatively (or in addition), email interface 214 can communicate with third parties. For example, if system 200 is preparing job applications for user 200, email interface 214 may be used to send emails to solicit letters of reference from selected individuals. In some embodiments, email interface 214 can also receive emails including information relevant to the interview. For example, academic transcripts or tax documents can be emailed directly to system 200.

Data input/output interface allows for system 200 to automatically integrate with other data processing systems. For example, tax documents such as wage and income statements can be automatically retrieved from payroll providers or financial institutions. Similarly, academic transcripts can be retrieved electronically so that user 202 need not manually enter the data. Additionally, data (once processed) can be automatically exported to other systems. For example, taxes can be e-filed by communicating with the appropriate governmental taxation authority via data input/output interface 216, resumes could be automatically uploaded to professional networking sites (such as, for example, LinkedIn®), and college applications could be submitted to the relevant colleges.

System 200 may further communicate with user history data store 220, form data store 222, and interview script data store 224. One of skill in the art will appreciate that these data stores may be distinct data stores, distinct portions of a single data store or merely distinct types of information stored in a single data store. Broadly, user history data store 220 stores information previously gathered from user 202 in order that they are not required to re-enter it. For example, a taxpayer's prior year tax returns may be stored in user history data store 220. Since a taxpayer's identification information will typically remain the same from year to year, information such as name and taxpayer identification number can be automatically determined without the user having to enter it. Similarly, information that is unlikely to change (address, dependent information, and employment information) can be presented to user 202 with a simple confirmation that it is still current rather than requiring complete reentry. In the job application context, information from prior job applications (such as employment history and credentials) can be reused for new applications. Furthermore, if the system is used in multiple contexts, information can be re-used across contexts. For example, "current employer" information from a job application may be used to prompt a user for a wage statement from that employer in the context of tax preparation. Similarly, information provided for tax purposes could be reused when completing a financial aid portion of a college application.

Form data store 222, by contrast, stores forms to be populated with information from user 202. For example, in the college application context, each college will provide a form for an applicant to provide their information. Generally, each college may require different information, and each may require that it be provided in a different format and order. By communicating with user 202, system 200 can determine to which colleges they wish to apply and, therefore, which application forms must be completed. Interview engine 204 can then determine the superset of information needed to complete all of the forms. By completing all forms at once, questions that appear on multiple forms need only be answered once. Similarly, in the tax context, information can be gathered in a natural order to complete all required tax forms, rather than completing the forms sequentially. In some embodiments, forms are stored in form data store 222 in a format such that they can be printed once completed. For example, forms may be stored in fillable PDF format. In other embodiments, forms are stored in purely notional form for electronic submission. For the purposes of this specification, the term "form" may refer to a blank paper form, a filled paper form, a blank digital form, a completed digital form, or a structured set of information useable to complete a particular digital form.

Interview script data store 224 stores questions and prompting strategies for determining particular items of information from user 202. For example, to obtain the name of user 202, interview script data store 224 might store information as depicted in Table 2 below. One of skill in the art will appreciate that the scripts for other, more complicated pieces of information will be more involved and may include logic to allow chat engine 208 to break the question down into smaller, simpler components. In some embodiments, the interview engine stores scripts in JavaScript Object Notation. In some such embodiments, the scripts may themselves contain executable JavaScript code to guide chat engine 208 in correctly prompting user 202 for the needed information.

TABLE 2

| Field Name | FULL_NAME |
|---|---|
| Field Type | Free text |
| Prompt Unknown | "What is your full legal name?" (Free text) |
| Prompt Unsure | "Is your name still _____?" (Y/N) |
| Prompt Sure | None (Silent Import) |
| Explanation | "Your full legal name is the name on your driver's license and other legal documents." |
| Analytics | User requested explanation (Y/N) |

Some interview questions may not request information used in completing the form, but instead control the user's interaction with the system. For example, if user consent is required for certain operations (e.g., tracking the user or utilizing data collected during the interview for marketing purposes), then the user's consent may be requested in an interview question during the normal flow of the interview. Responses such as user consent can be used to control the operation of the engine directly and/or stored in user history data store 220.

In some embodiments, interview questions may additionally be tagged with analytics data, as shown above in FIG. 2. Such analytics tags can collect data about the user's response to the interview question or about the user's interaction with the system while answering the question. For example, some or all questions may be tagged with analytics data regarding whether the user asked for a more detailed explanation of the question, or asked for help answering the questions. Other types of analytics are also possible. For example, user opt-in data to optional features (such as notifications on a mobile phone) may also be tracked.

In some embodiments, interview script data store may additionally store interview ordering and flow information. As described above, in some embodiments the interviews carried out by system 200 are modeled after the interview that would be carried out by a human subject matter expert. In some embodiments, this flow information takes the form of a list of questions in the order they should be presented to the user. In other embodiments, the flow is more complicated. Questions not present on any form to be completed can be asked to determine which other questions should be asked of the user. For example, if a user has not attended college, questions relating to college attended, major, grade point average, and so forth can be skipped completely.

Figure 3:
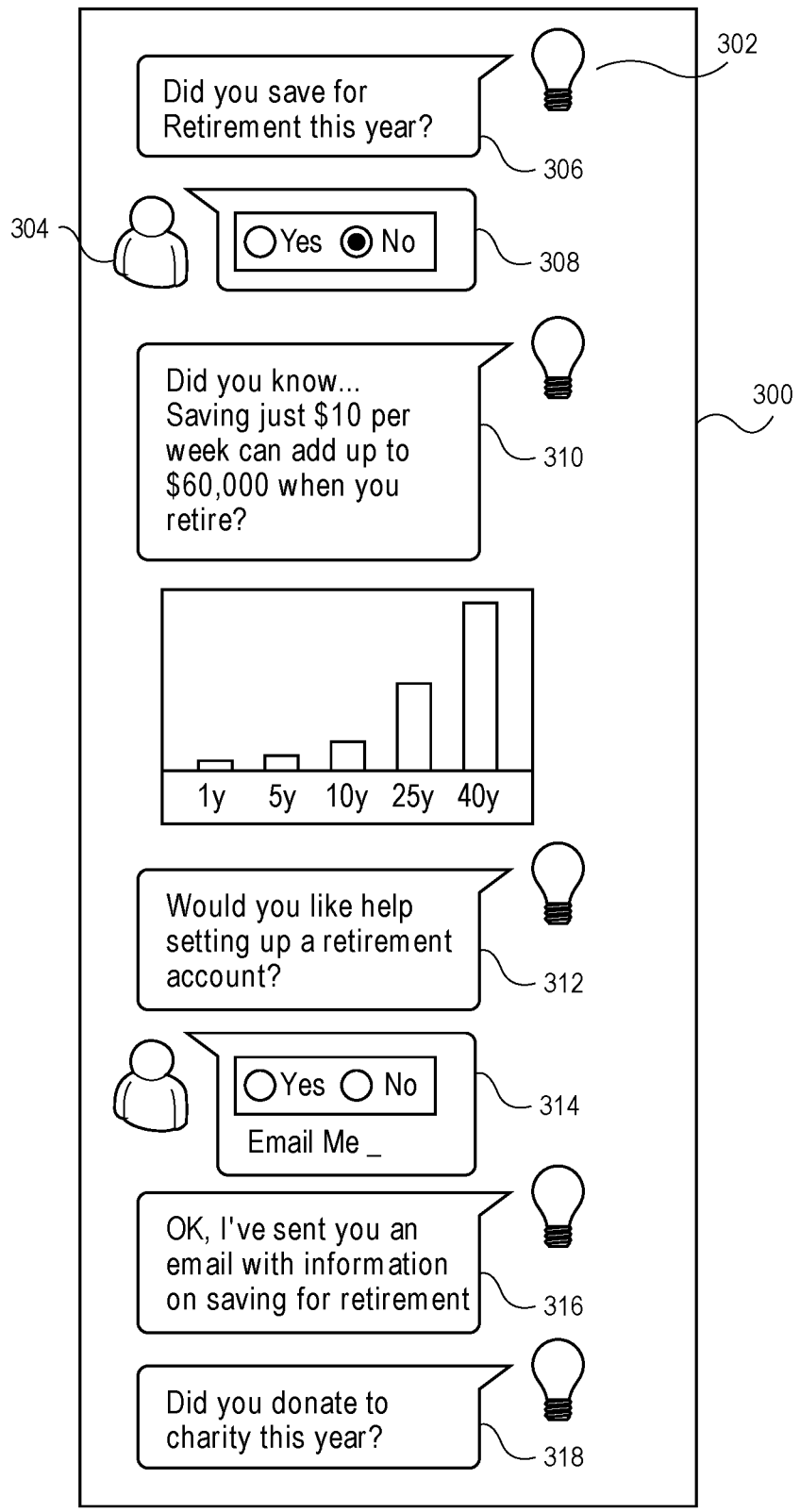
FIG. 3 depicts an exemplary interface depicting a chat in accordance with embodiments of the invention.

Turning now to FIG. 3, an exemplary interface depicting a chat in accordance with embodiments of the invention is depicted and referred to generally by reference numeral 300. Interface 300 is suitable for use on any of the variety of computing devices described with respect to FIG. 1. As depicted, a hybrid chat system 302 embodying the invention is conducting a tax interview with a taxpayer 304. In the depicted interview, hybrid chat system 302 asks taxpayer 304 if they have saved for retirement this year in question 306. As discussed above, certain questions may not request information that is used in completing the form (here, the tax return for taxpayer 304). Rather, this question is used to determine whether to ask other, more specific questions relating to retirement savings, such as (for example) "How much have you contributed to a Roth IRA this year?"

Here, the user is presented with rich chat bubble 308 populated with a "yes/no" radio button. In the depicted embodiment, interaction widgets used for input are may be presented on the side of the conversation corresponding to taxpayer 304. In other embodiments, such interaction widgets are presented on the side corresponding to hybrid chat system 302. In still other embodiments, interaction widgets are presented at the bottom of interface 300 or in another convenient location. As shown, taxpayer 304 has selected to "no" button.

As specified in the relevant interview script, this response both skips the other retirement-related questions and triggers rich chat bubble 310. Rich chat bubble 310 includes a text element and an image element. In the depicted embodiment, interaction widgets used for output are presented on the side corresponding to hybrid chat system 302. Since rich chat bubble 310 does not require any response from taxpayer 304, the interview script can proceed directly to the next question. In some embodiments, the system may instead pause between messages to avoid overwhelming the user with too many messages in quick succession. In some such embodiments, a "pause/ok" widget is used which pauses for a pre-specified amount of time, or until the user acknowledges the previous message and indicates that they are ready to proceed.

Next, hybrid chat bot presents chat bubble 312, asking if the user wants help setting up a retirement savings account. This illustrates the logic in the relevant interview script: if taxpayer 304 had instead replied "yes" in rich chat bubble 308, the system would not have presented chat bubbles 310 and 312, but instead gathered information from taxpayer 304 about their retirement contributions. As with rich chat bubble 308, taxpayer 304 is presented with "yes/no" radio buttons in rich chat bubble 314. However, in this instance, the user uses the free text widget to say "Email me" rather than the radio button widget to indicate yes or no. NLP module 208 determines that, for the purposes of the interview script, this response should be treated as a "no," but that email interface 214 should be used to send the taxpayer the relevant information via email.

Hybrid chat system 302 acknowledges this in chat bubble 316. This illustrates the context-sensitive nature of chat engine 208. If taxpayer 304 had instead selected "no" in rich chat bubble 314, this response would not have occurred. However, chat engine 302 notices that email interface 214 has been invoked and knows that the context is retirement savings, so it is able to generate a context-appropriate response. Having done so, hybrid chat engine proceeds to the next question specified by the interview script at chat bubble 318 and the interview continues. One of skill in the art will appreciate that this discussion covers only a small subset of the various widgets and interactions enabled by hybrid chat system 302, and it is presented as an illustrative example.

Figure 4:
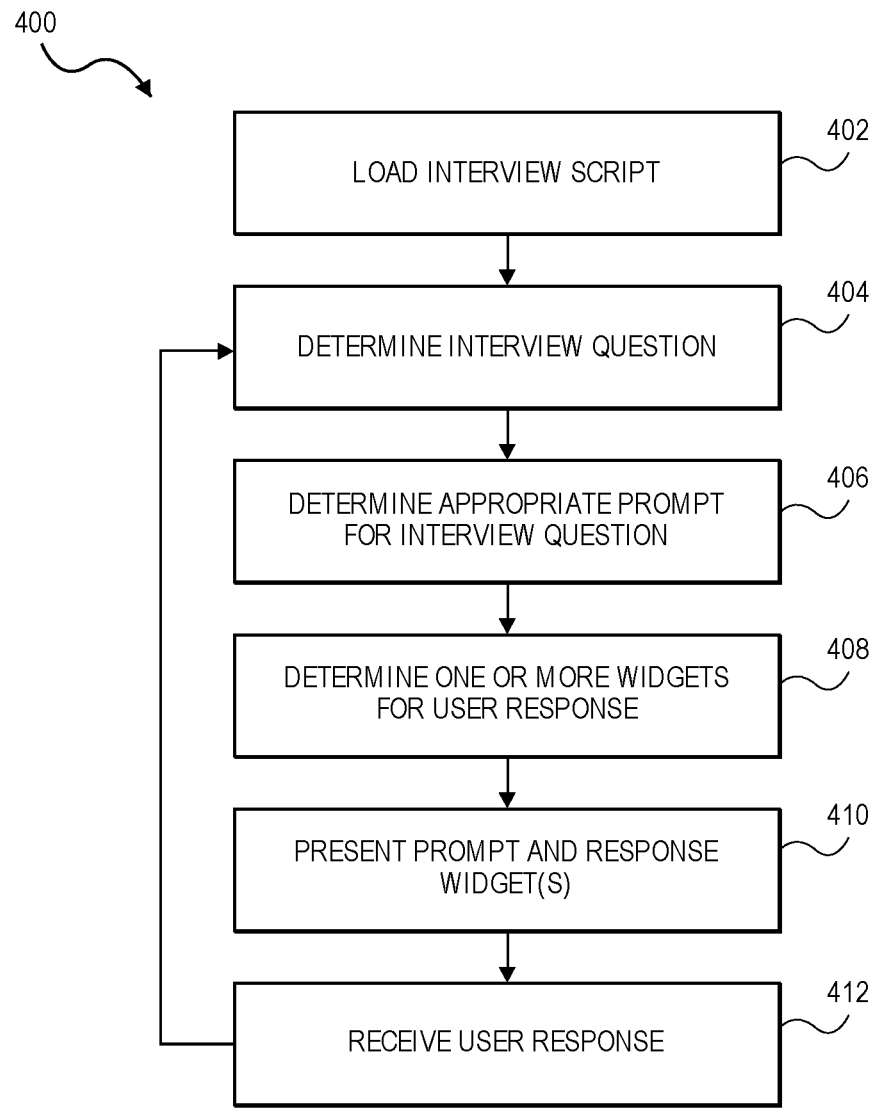
FIG. 4 depicts a flowchart illustrating the operation of a method in accordance with one embodiment of the invention.

Turning now to FIG. 4, a flowchart illustrating the operation of a method in accordance with one embodiment of the invention is depicted and referred to by reference numeral 400. Processing begins at a step 402, where an interview script for the interview being conducted is loaded. As discussed above, in some embodiments the hybrid chat system can be applied in a wide variety of contexts and, as such, the interview script determines the context of the interview, the flow of the interview, and (in combination with the forms to be completed) the questions that will be asked in the interview. Because the system can be adapted to any context, even completely unrelated interviews can be conducted simultaneously.

Next, at step 404, a question to be asked is determined. In some embodiments, the first question to be asked is determined based on the interview script. Later questions to be asked can be determined based on the interview script in combination with some, all, or none of the user's responses to prior questions. Broadly, for the purposes of flowchart 400, a "question" is either a data point to be gathered from the user or information to be presented to the user with no response needed.

Processing can then proceed to step 406, where a prompt corresponding to the question is determined. As discussed above, the prompt for a question may vary depending on a variety of factors. For example, a new user might be prompted in greater detail than a returning user. Similarly, the prompt for a question might depend on the context. If a user has just answered a similar question, the prompt may be shorter than the first time the question was asked. The prompt may further depend on whether relevant information is stored for the user in the user history data store.

After (or concurrently with) step 406, one or more user interface widgets is selected with which the user can respond to the question at step 408. The widget selected may depend on the question (for example, a question soliciting a state may use a dropdown list, a question soliciting an address may use a map picker, and a question soliciting a name may use a free-text box), the user's history (for example, information entered previously may only need to be verified with "yes/no" radio buttons rather than re-entered from scratch), or the user's preferences (for example, a first user might prefer a checklist, while a second user might prefer a series of "yes/no" radio buttons). As mentioned above, widgets may be used in combination. For example, a set of "yes/no" radio buttons asking whether a previously entered value is still correct might be combined with the appropriate widget to enter a new value if "no" is selected. In some embodiments, a free-text entry is combined with other widgets to allow a user to ask for help, ask clarifying questions, or supply additional details.

Processing can then proceed to step 410, where the prompt and widget(s) are presented to the user and step 412, where the user's response is received. As discussed above with respect to FIG. 3, prompts and response widgets can be presented in any way convenient and comprehensible to the user. One of skill in the art will appreciate that the form of the response will vary from widget to widget and may need to be converted to the form required by a particular form. Similarly, free-text responses may need to be standardized via Natural Language Processing to a format expected by a particular form or for storage in the user history data store. Once standardized, the user's responses can be entered directly on the relevant forms, stored in the user history data store and an interview transcript, and used to guide the course of the interview for the next question. At this point processing can return to step 404 to determine the next question until the interview has been completed.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of conducting an interview with a user comprising the steps of:
    loading an interview script including a plurality of interview questions;
    determining a question for the user based on the interview script and one or more prior responses previously given by the user;
    determining a prompt for the question based on the question, a level of expertise of the user, and a current context of the interview;
    determining one or more response widgets of a plurality of types of response widgets for the question based at least in part on a type of information being sought by the question;
    presenting a rich chat message to the user including the one or more response widgets and a free-text widget;
    receiving, from the user, a free-text response to the question via the free-text widget;
    maintaining context throughout the interview based on a user history data store comprising data from a past interaction with the user; and
    presenting, to the user, a context-appropriate further explanation based at least in part on the free-text response and the context, wherein the context-appropriate further explanation is a clarified reformulation of the prompt.

2. The method of claim 1, further comprising the step of adding the prompt for the question and the user's response to the question to an interview transcript.

3. The method of claim 1, wherein the one or more response widgets include a free-text response widget and an additional response widget.

4. The method of claim 3, wherein the additional response widget is a radio button widget.

5. The method of claim 1, further comprising the steps of:
    determining an additional question based on the response to the question;
    determining an additional prompt for the additional question;
    determining one or more additional response widgets for the additional question,
    wherein the one or more additional response widgets for the additional question include a response widget distinct from the one or more response widgets for the question.

6. The method of claim 1, wherein a response to the question is automatically determined based on a history for the user and the prompt for the question includes a request for the user to confirm the automatically determined response.

7. A system for conducting an interview with a user comprising one or more non-transitory computer-readable media storing computer-executable instructions that, when executed by at least one processor, access a storage device, storing:
    an interview script data store storing a plurality of questions;
    an interview engine, programmed to:
        retrieve, from the interview script data store, a question of the plurality of questions;
    a chat engine, programmed to:

determine a prompt for the question based on a current context of the interview and a level of expertise of the user;
a user interface engine, programmed to:
determine one or more response widgets of a plurality of types of widgets for the question based at least in part on a type of information being sought by the question;
present the prompt and the one or more response widgets for the question to the user; and
determine a first response to a first widget of the one or more response widgets when the user responds to a second widget of the one or more response widgets;
determine a context-appropriate further explanation to a free-text response from the user,
wherein the context-appropriate further explanation is reformulated and clarified based on a user history data store comprising data from a past interaction with the user and the free-text response; and
a live chat interface, programmed to:
interface with a subject matter expert such that the subject matter expert can seamlessly enter the interview and chat with the user.

8. The system of claim 7, wherein the computer-readable media further stores an email interface programmed to send email to the user based on a completed interview.

9. The system of claim 7, wherein the computer-readable media further stores a data input/output interface programmed to communicate, via a network, with another computer system to automatically determine a response to one of the plurality of interview questions.

10. The system of claim 7, wherein:
the computer-readable media further stores a forms data store storing a plurality of forms, and
wherein the interview engine is further programmed to complete a form of the plurality of forms based on the interview.

11. The system of claim 7, wherein:
the reformulated and clarified context-appropriate further explanation is shorter than the first response.

12. The system of claim 7, wherein the computer-readable media further stores a natural-language processing module programmed to provide at least one radio button with the free-text widget.

13. The system of claim 7, wherein the one or more response widgets include a free-text response widget and an additional response widget.

14. One or more non-transitory computer storage media storing computer-executable instructions that, when executed by a processor, perform a method of conducting an interview with a user comprising the steps of:
determining an interview question for the user based on a current context of the interview;
determining a prompt for the interview question based on the interview question, a current context of the interview, and an expertise level associated with the user;
determining one or more response widgets of a plurality of types of widgets for the interview question based at least in part on a type of information being sought by the interview question;
presenting a rich chat message to the user including the one or more response widgets;
receiving a free-text response from the user via a free-text widget; and
determining a context-appropriate further explanation based at least in part on the free-text response,
wherein the context-appropriate further explanation is reformulated and clarified based at least in part on the current context of the interview and on a user history data store comprising data from a past interaction with the user.

15. The computer storage media of claim 14, wherein the method further comprises the step of adding the prompt for the interview question and the user's response to the interview question to an interview transcript.

16. The computer storage media of claim 14, wherein the one or more response widgets includes a free-text response widget and an additional response widget.

17. The computer storage media of claim 14, wherein the method further comprises the steps of:
determining an additional interview question based on the response to the interview question;
determining an additional prompt for the additional interview question;
determining one or more additional response widgets for the additional interview question,
wherein the one or more additional response widgets for the additional interview question include a response widget distinct from the one or more response widgets for the interview question.

18. The computer storage media of claim 14, wherein a response to the question is automatically determined based on a history for the user and the prompt for the question includes a request for the user to confirm the automatically determined response.

19. The computer storage media of claim 14, wherein a response to the question is automatically determined based on data retrieved via a data input/output interface and the prompt for the question includes a request for the user to confirm the automatically determined response.

* * * * *